United States Patent
Liebenberg et al.

(10) Patent No.: US 6,746,019 B1
(45) Date of Patent: Jun. 8, 2004

(54) SEAL ASSEMBLY

(75) Inventors: Johannes Jacobus Liebenberg, Gauteng (ZA); Johan Francois De Villiers, Gauteng (ZA)

(73) Assignee: Eskom, Gauteng (ZA)

( * ) Notice: Subject to any disclaimer, the term of this patent is extended or adjusted under 35 U.S.C. 154(b) by 159 days.

(21) Appl. No.: 10/070,022

(22) PCT Filed: Aug. 23, 2000

(86) PCT No.: PCT/IB00/01152

§ 371 (c)(1),
(2), (4) Date: Feb. 26, 2002

(87) PCT Pub. No.: WO01/16510

PCT Pub. Date: Mar. 8, 2001

(30) Foreign Application Priority Data

Aug. 27, 1999 (ZA) .............................. 99/5531

(51) Int. Cl.[7] ............................ F16J 15/43; F01D 11/02
(52) U.S. Cl. ...................... 277/410; 277/409; 277/411; 277/317
(58) Field of Search .................... 277/409, 410, 277/411, 412, 413, 317, 321, 929, 301, 303

(56) References Cited

U.S. PATENT DOCUMENTS

| | | | | | |
|---|---|---|---|---|---|
| 3,971,563 | A | * | 7/1976 | Sugimura | 277/413 |
| 5,064,205 | A | * | 11/1991 | Whitford | 277/317 |
| 5,137,286 | A | * | 8/1992 | Whitford | 277/410 |
| 5,263,816 | A | * | 11/1993 | Weimer et al. | 415/131 |
| 6,220,602 | B1 | * | 4/2001 | Webster et al. | 277/410 |

* cited by examiner

Primary Examiner—Lynne H. Browne
Assistant Examiner—Michael J. Kyle
(74) Attorney, Agent, or Firm—Howrey Simon Arnold & White, LLP

(57) ABSTRACT

A seal assembly (10) includes a first seal element (12) defining a fist sealing surface (14); displacement means including at least one electromagnet (20) operatively coupled with the first seal element (12), the displacement means being operable to displace the first seal element (12) via the, or each, electromagnet (20); and a second seal element defining a second sealing surface (28) associated with the first sealing surface (14), the first and second seal elements providing a seal. The invention extends to a combination comprising a gas turbine and a seal assembly. The invention further extends to a method of controlling a spacial relationship between respective sealing surfaces of two seal elements.

19 Claims, 3 Drawing Sheets

SEAL ASSEMBLY

This application claims priority under 35 USC §371 of International application number PCT/IB00/01152, filed Aug. 23, 2000 which claims priority to South African application number 99/5531, filed Aug. 27, 1999.

This invention relates to a seal. In particular the invention relates to a seal assembly. The invention further relates to a method of controlling a spacial relationship between two sealing surfaces. Still further, the invention relates to a machine incorporating a seal assembly.

According to a fast aspect of the invention there is provided a seal assembly which includes
- a support member;
- a first seal element defining a first sealing surface;
- a second seal element which is rotatable relative to the support member and the first seal element, the second seal element defining a second sealing surface which together with the first sealing surface forms a seal; and
- displacement means including at least one electromagnet acting between the first seal element and the support member to permit displacement of the first seal element relative to both the support member and the second seal element.

The seal assembly may include a sensor means for sensing a displacement of the second seal element from a first datum position.

The seal assembly may include control means operably connected to the sensor means and the displacement means, the control means being operable to control the displacement means to maintain the first sealing surface in a predetermined spacial relationship with the second sealing surface.

The seal assembly may include a biasing means for biasing the first seal element in a predetermined direction. The biasing means may bias the first seal element towards the second seal element. Instead, the biasing means may bias the first seal element away from the second seal element. The biasing means may be configured to exert a force which is a function of a displacement of the biasing means from a second datum position.

The displacement means may include a plurality of electromagnets in spaced relationship with respect to one another and the control means may be operable to control each of the electromagnets. Then, the sensor means may include a plurality of sensors, a sensor being associated with each of the electromagnets. The control means may be operable to control each of the electromagnets independently. Instead, the control means may be operable to control sub-sets of the electromagnets in unison.

The first seal element may comprise an annular ring defining an annular first sealing surface and the second seal element may define an annular second sealing surface. Then, the seal assembly may include a rigid carrier member on which the first annular seal element is mounted, the electromagnets being operatively coupled with the carrier member and angularly spaced with respect thereto to permit displacement of the carrier member relative to the support member.

Further, each of the electromagnets of the displacement means may have a core element displaceable with respect to a coil, one of the core element and the coil being connected to the carrier member of the first seal element and the other of the core element and the coil being connected to the support member.

In one embodiment of the invention the seal assembly may provide a seal on a rotating element of a machine. Then, the first seal element may comprise an annular ring defining an annular first sealing surface. The second element may be the rotating element of the machine and may define a second sealing surface which also comprises an annular ring. The first annular seal element may be mounted on a rigid carrier member. The displacement means may include a plurality of electromagnets coupled with the carrier member and angularly spaced on the carrier member. The electromagnets of the displacement means may have a movable core element. The movable core element may be attached to the carrier member of the first seal element. The coils of each electromagnet may be attached to a support member which may be fixed in position. It will be appreciated that by controlling the current in the coil of each electromagnet the magnetic flux of the electromagnet may be selectively varied thereby selectively varying the force on the core element of the electromagnet. Thus, a lateral force of a preselected strength may be applied to the first seal element at the position of each electromagnet. It will further be appreciated that by selectively varying the lateral force of each electromagnet the entire annular first seal element may be displaced so that a plane defined by the first seal element is displaced in a direction perpendicular to the plane. Instead, the plane may be tilted in a preselected direction with respect to a symmetrical axis of the first seal element.

In a particular embodiment of the invention, the second seal element may comprise a downstream portion of a power generator gas turbine. It will be appreciated that a turbine rotating on a shaft about a rotation axis may move on its bearings both axially and radially. In addition, the longitudinal axis of the turbine may precess. It will further be appreciated that the gap between a downs sealing surface defined on a downstream end of the turbine rotor (providing the second seat element) and a sealing surface of an annular seal element (providing the first seal element) sealing on the said downstream sealing surface will vary with the displacement of the turbine rotor. Accordingly, if the said gap is to be maintained within predetermined limits, the first seal element must be allowed to move in a manner related to the movement of the rotating second sealing surface of the turbine rotor. The sensing means may be operable to sense displacement of the turbine shaft or any rotating components rotatably fixed to the shaft, such as the downstream sealing surface of the turbine rotor. Instead, the sensing means may comprise a plurality of sensors which sense the distance between the first and second sealing surfaces at preselected locations.

According to a further aspect of the invention there is provided a combination comprising a gas turbine including a turbine rotor having a downstream end and a seal assembly as hereinbefore described, the second sealing surface of the seal assembly being arranged on the downstream end of the turbine rotor.

Then, the sensor means of the seal assembly may sense displacement of the second seal element from the first datum position directly. The sensor means of the seal assembly may include a plurality of sensors, each of which being operable to sense a distance between the first and second sealing surfaces at a respective preselected location, the position of the first sealing surface at the said location defining the first datum position.

Instead, the sensor means of the seal assembly may sense displacement of the second seal element from the first datum position indirectly by sensing a displacement from a datum position of a component of the gas turbine mechanically fast with the rotor thereof.

The combination may include biasing means for biasing the first seal element in a predetermined directions the at least one electromagnet being configured to displace the first seal element relative to the support member in a direction opposite to the predetermined direction.

Further, the biasing means may comprise an annular gas impermeable bellows arranged between the carrier member and the support member.

According to another aspect of the invention there is provided a method of controlling a spacial relationship between respective sealing surfaces of two seal elements, the method including the steps of sensing a displacement of one of the seal elements, which seal element is rotatable relative to a support member and to the other seal element, from a datum position; and displacing the other of the seal elements by means of a displacement means including at least one electromagnet acting between the other of the seal elements and the support member, the said other seal element being operatively coupled with the displacement means via the, or each, electromagnet to maintain a preselected spacial relationship between the two sealing surfaces.

The datum position may be defined by the sealing surface of said other seal element, and the method may include sensing the distance between the two sealing surfaces and displacing the said one seal element to maintain a preselected distance between the two sealing surfaces.

The displacement means may include a plurality of electromagnets and the method may include selectively varying the magnetic flux in each of the electromagnets.

The invention is now described, by way of example, with reference to the accompanying diagrammatic drawings.

Figure 1:
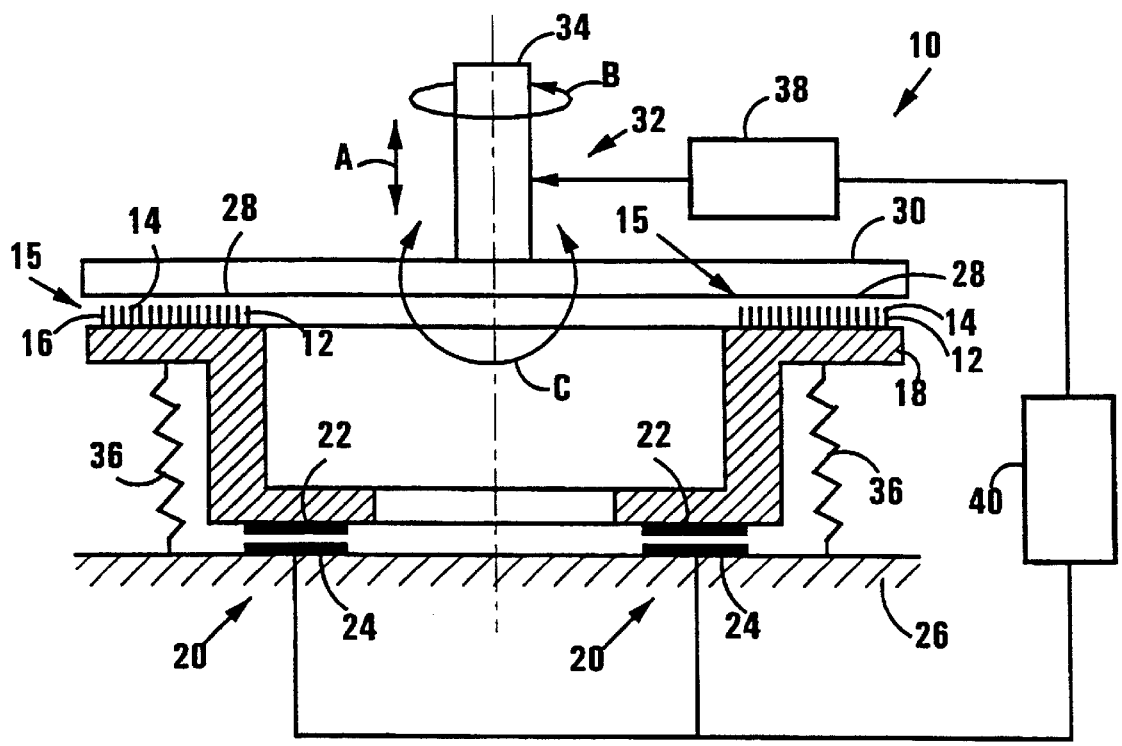
FIG. 1 shows a schematic sectional side view of a first embodiment of a seal assembly in accordance with the first aspect of invention.

In the drawings, reference numeral 10 generally refers to a seal assembly in accordance with the invention.

Figure 2:
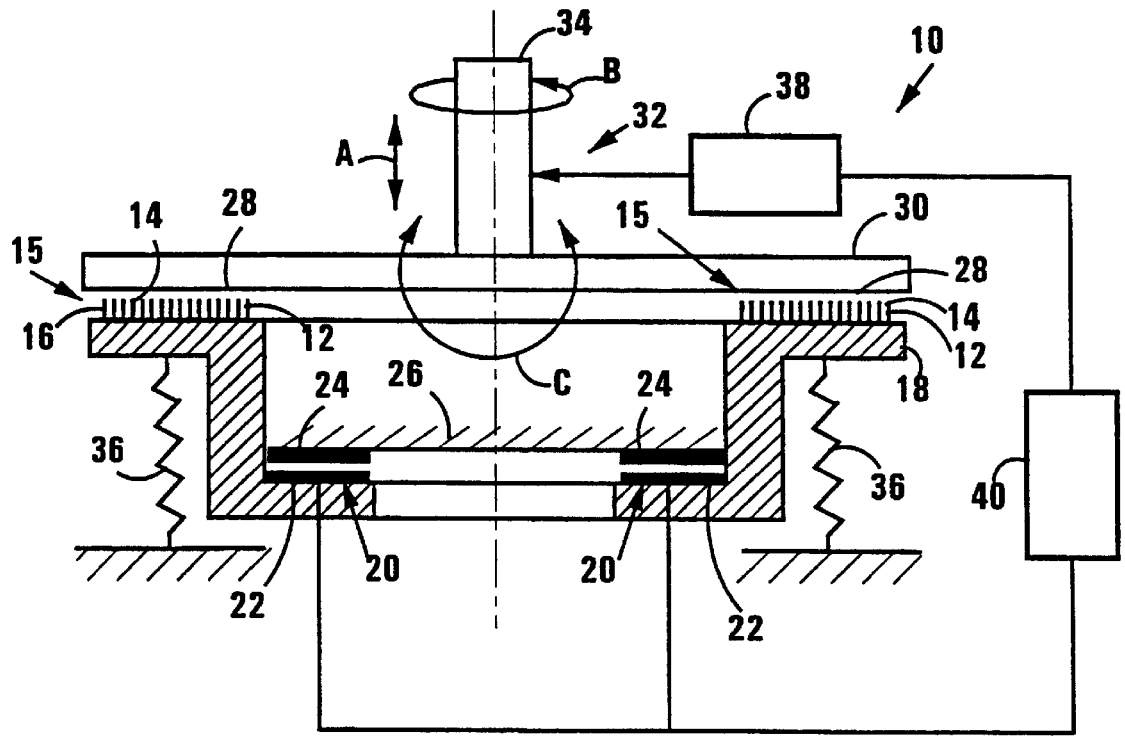
FIG. 2 shows a schematic sectional side view of a second embodiment of the seal assembly.

In FIGS. 1 and 2, the seal assembly 10 has a first seal element 12 defining a first sealing surface 14. The first seal element is an annular seal 16 which is mounted on a rigid annular carrier member 18. The seal assembly 10, further has a plurality of electromagnets 20, two of which are illustrated schematically in FIGS. 1 and 2. A movable component 22 of the electromagnets 20 is attached to the support 18, while a stationary component 24 of the electromagnets 20 is attached to a fixed support member 26. In the drawings, the first sealing surface 14 is shown forming a seal 15 in cooperation with a second sealing surface 28, which is defined on a rotating element 30 of a machine 32, being a power generator gas turbine, the rotating element 30 being mounted on a shaft 34. The seal assembly 10 further includes a biasing means, indicated schematically in the drawings by the device labeled 36.

In the embodiment of the seal assembly 10 shown in FIG. 1, the biasing means 36 normally urges the annular carrier member 18 away from the support member 26, so that the first and second sealing surfaces, 14 and 28 respectively, are normally urged towards one another. The electromagnets 20 are operable to urge the carrier member 18 towards the support member 26 and, consequently, the first and second sealing surfaces, 14 and 28, away from one another. By controlling the magnetic flux of the electromagnets 20, the force exerted on the annular carrier member 18 by the urging means 36 may be balanced by an opposed force exerted on the carrier member 18 by the electromagnets 20. In this way a predetermined gap may be maintained between the first and second sealing surfaces 14 and 28.

It will be appreciated that the biasing means 36 may be configured to normally urge the carrier member 18 towards the support member 26 so that the first and second sealing surfaces, 14 and 28 respectively, are normally urged away from one another. Such a configuration is provided in the embodiment illustrated in FIG. 2. In this case, the electromagnets 20 are operable to urge the carrier member 18 away from the support member 26.

Generally, the shaft 34 of a machine 32 will not run perfectly true. Thus, while rotating, as indicated by the arrow marked "B" in the drawings, the shaft 34 may move on its bearings in an axial direction, as indicated by the arrow marked "A" in the drawings, or transversely in a radial direction, or both. Further, the shaft 34 may process about its own axis, as indicated by the arrow labeled "C" in the drawings. Consequently, the gap between the first and second sealing surfaces 14 and 28 will generally vary with each rotation of the shaft 34, if the first sealing surface 12 is fixed in position. In order to reduce the extent of variation in the spacing gap, the movement of the second sealing surface 28 is detected and measured via a sensor, indicated in the drawings by reference numeral 38, which detects displacement of the shaft 34 from a datum position, the displacement of the shaft 34 bearing a known relationship to displacement of the second sealing surface 28. It will be appreciated that displacement of the second sealing surface 28 may be detected and measured directly, as may variation in the gap between the first and second sealing surfaces 14 and 28. A controller, indicated on the drawings by reference numeral 40, is operable to control each of the electromagnets 20 independently by varying the magnetic flux of each electromagnet 20, thereby selectively increasing or decreasing the force exerted by an electromagnet 20 on the carrier member 18. In this way, the entire carrier member 18, and consequently the first sealing surface 14, may be displaced axially, or tilted in any desired direction. The first sealing surface 14 may be controlled to mimic the movement of the second sealing surface 28 as it is displaced from its true position. Instead, the first sealing surface 14 may be controlled to maintain a preselected average gap between the first and second sealing surfaces 14 and 28.

Figure 3:
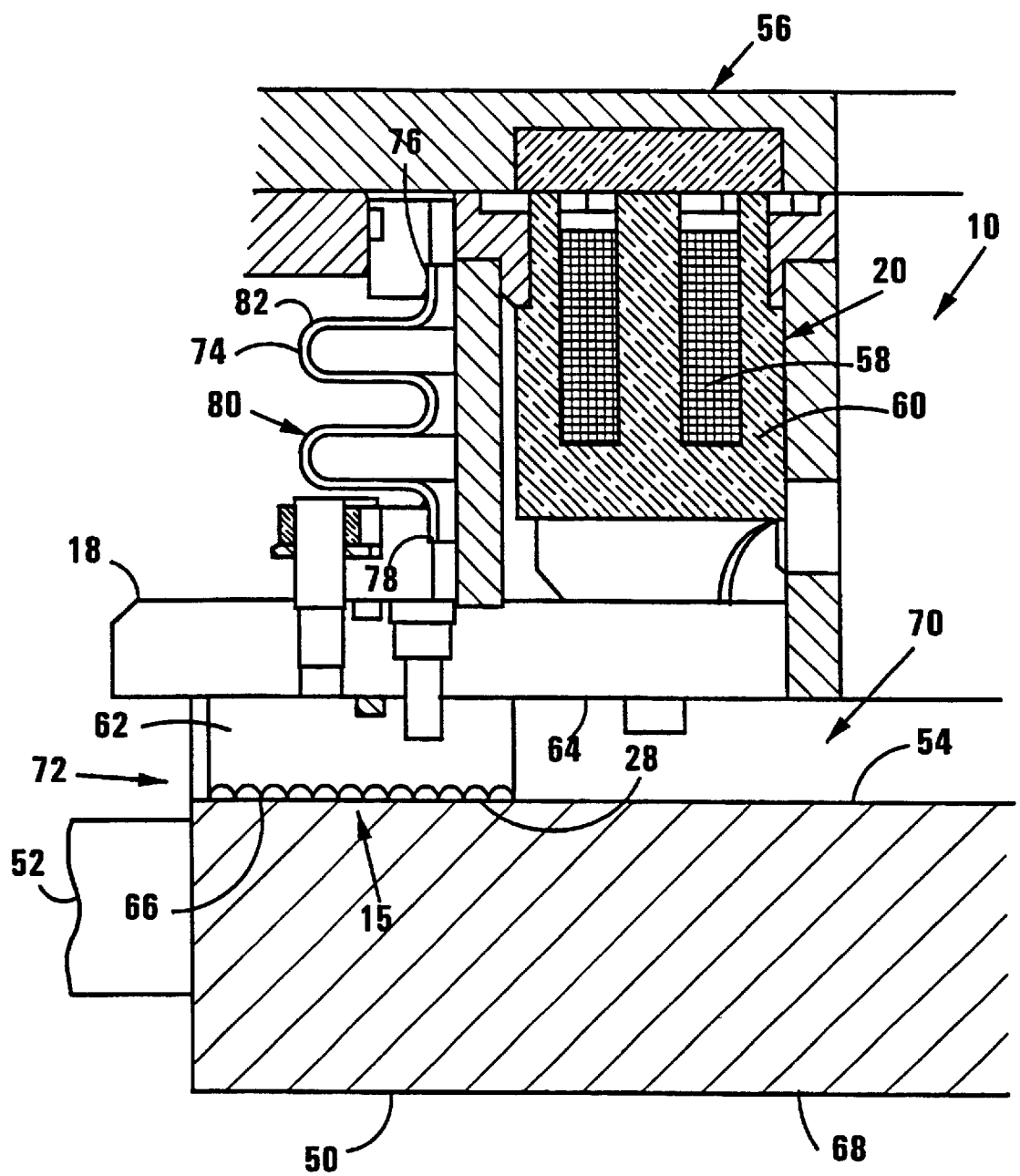
FIG. 3 shows a sectional side view of a detail of the seal assembly in use on a turbine rotor.
Figure 4:
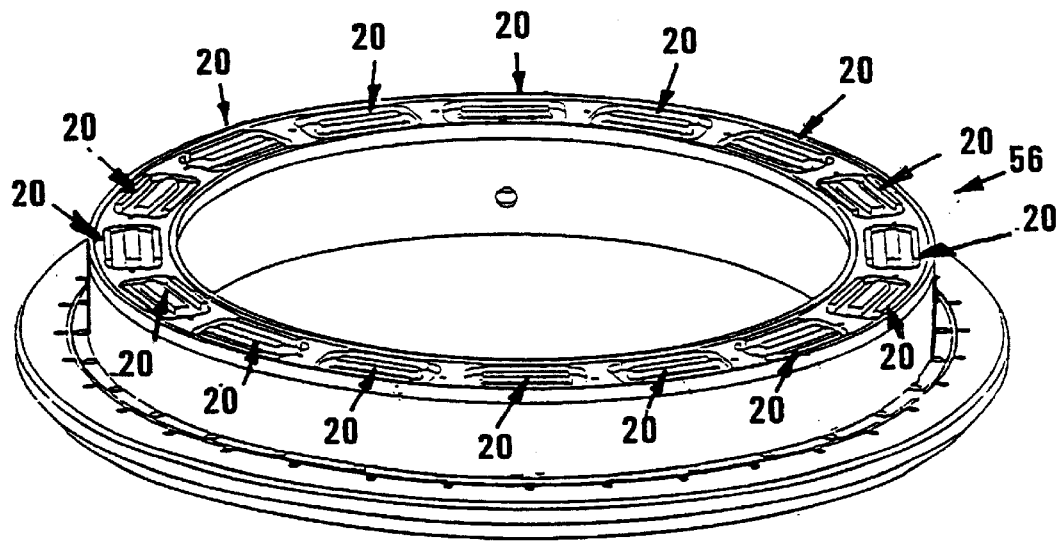
FIG. 4 shows a three-dimensional view of a portion of the seal assembly of FIG. 3.
Figure 5:
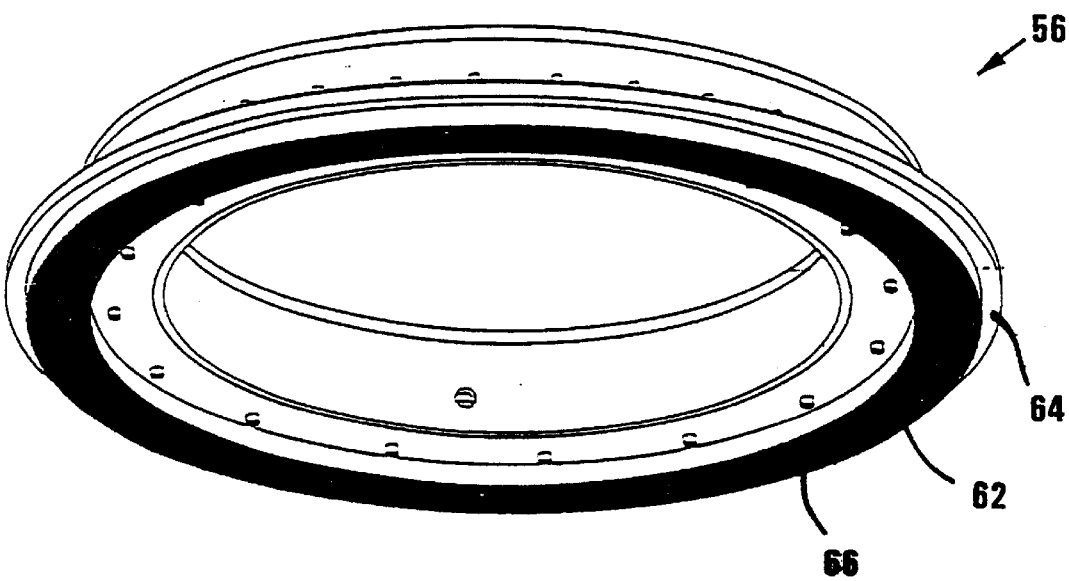
FIG. 5 shows a further three-dimensional view of the portion of the seal assembly of FIG. 3.

We now turn to FIGS. 3 to 5, which show a seal assembly 10 in use on a gas turbine power generator rotor 50. In FIGS. 3 to 5, with reference to FIGS. 1 and 2, like components are indicted by like reference numerals, unless otherwise stated.

The turbine rotor 50 has a plurality of circumferentially spaced vanes, one example of which is labeled 52, and the seal assembly 10 is located on a downstream end 54 of the rotor 50. The seal assembly 10 is mounted on a fixed support assembly 56 and has sixteen electromagnets 20 evenly spaced about the circumference of the support assembly 56. Each of the electromagnets 20 has a coil 58 and a movable core element 60, the coils 58 being mounted on the support assembly 56 and the core elements 60 being mounted on an annular carrier member 18. It will be appreciated that instead the coils 58 of the electromagnets 20 may be mounted on the carrier member 18 and the core elements 60 may be mounted on the support assembly 56. An annular labyrinth seal 62 is arranged on an underside 64 of the carrier member 18 and defines a labyrinthine surface 66, which comprises the first sealing surface 14 of the seal assembly 10. The second sealing surface 28 of the seal assembly 10 comprises an annulus defined on the downstream end 54 of the turbine rotor 50. It will be appreciated that the second sealing surface may be in any suitable form so that, for example, a second labyrinth seal may be arranged on the downstream end 54 of the turbine rotor 50 to define the second sealing surface 28.

The second labyrinth seal may be configured to cooperate with the labyrinth seal 62 of the annular carrier member 18.

An annular steel bellows 74 is arranged between the support assembly 56 and the carrier member 18, a first end 76 of the bellows 74 being connected to the support assembly 56 and a second end 78 of the bellows 74 being connected to the annular carrier member 18. The steel bellows 74 is configured to provide a biasing means 80, normally urging the labyrinth seal 62 away from the downstream end 54 of the turbine rotor 50. In this configuration, if power to the electromagnets 20 fails, the labyrinth seal 62 will move away from the downstream end 54 of the turbine rotor 50, thereby avoiding massive damage to the seal 62 which would result from direct contact with the rapidly rotating turbine rotor 50. It is to be appreciated, however, that the biasing means 80 may be configured to normally urge the labyrinth seal 62 towards the second sealing surface 28. It will be appreciated that on large gas turbine machines, a stream of gas at high pressure flowing from an upstream end 68 of the turbine rotor 50 towards the downstream end 54 of the rotor 50 will create large axial forces on the turbine shaft (not shown). In order to obviate this problem, a flow of gas at high pressure is directed to a downstream region 70 adjacent the downs end 54 of the turbine rotor 50, to reduce the difference between forces on the downstream and upstream ends, 54 and 68 respectively, of the turbine rotor 50 and balancing the axial forces operative on the turbine shaft. An extendably retractable gas impermeable seal 82 is provided by the bellows 74, between the downstream region 70 and a low pressure region 72, normally at atmospheric pressure. It will be appreciated that in general such an extendably retractable seal, such as the seal 82, will be required to provide an impermeable barrier between the high pressure region 70 and a low pressure region 72 and to provide for axial displacement of the rotor 50, as described above. In order to maintain a relatively high pressure in the downstream region 70, a seal must be maintained closely proximate the rapidly rotating rotor 50 to minimize leakage of gas to the low pressure region 72. However, in order to inhibit rapid seal wear, the sealing surfaces 14 and 28 should not be in contact. Thus, a preselected gap should be maintained between the sealing surfaces 14 and 28. Generally, as explained above, the shafts of large machines do not run perfectly true. Consequently, in order to maintain a preselected gap, or to maintain a gap within preselected limits, the first sealing surface 14 must be enabled to track the second sealing surface 28. At least one sensor (not shown) is provided for sensing displacement of the turbine rotor 50 from a datum position. A controller (not shown) is operably connected to the sensors and to the electromagnets 20 and is operable to vary the magnetic flux in the electromagnets 20 in response to a signal from the sensors on sensing a displacement of the turbine rotor 50 from its datum position. It will be appreciated that, as required, the controller may control each of the electromagnets 20 independently. Instead, the controller may control subsets of the sixteen electromagnets 20, for example groups of four adjacent electromagnets 20 to operate in unison.

What is claimed is:

1. A seal assembly comprising:

a support member;

a carrier member on which a first seal element defining a first sealing surface is mounted;

a second seal element which is rotatable relative to the support member and the first seal element, the second seal element defining a second sealing surface which together with the first sealing surface forms a seal; and displacement means including a plurality of electromagnets in spaced relationship with one another acting between the first seal element and the support member to permit displacement of the first seal element relative to both the support member and the second seal element, each of the electromagnets of the displacement means having a core element displaceable with respect to a coil, one of the core element and the coil being connected to the carrier member of the first seal element and the other of the core element and the coil being connected to the support member.

2. The seal assembly as claimed in claim 1, which includes a sensor means for sensing a displacement of the second seal element from a first datum position.

3. The seal assembly as claimed in claim 2, which includes control means operably connected to the sensor means and the displacement means, the control means being operable to control the displacement means to maintain the first sealing surface in a predetermined spacial relationship with the second sealing surface.

4. The seal assembly as claimed in claim 3, in which the control means is operable to control each of the electromagnets independently.

5. The seal assembly as claimed in claim 3, in which the control means is operable to control sub-sets of the electromagnets in unison.

6. The seal assembly as claimed in claim 1, further comprising a biasing means for biasing the first seal element in a predetermined direction.

7. The seal assembly as claimed in claim 6, in which the biasing means is configured to exert a force which is a function of a displacement of the biasing means from a second datum position.

8. The, seal assembly as claimed in claim 1, in which the first seal element comprises an annular ring defining an annular first sealing surface and the second seal element defines an annular second sealing surface.

9. The seal assembly as claimed in claim 1, in which the electromagnets are operatively coupled with the carrier member and angularly spaced with respect thereto to permit displacement of the carrier member relative to the support member.

10. A combination comprising a gas turbine including a turbine rotor having a downstream end and a seal assembly as claimed in claim 1, the second sealing surface of the seal assembly being arranged on the downstream end of the turbine rotor.

11. The combination of claim 10, which includes a sensor means for sensing a displacement of the second seal element from a first datum position.

12. The combination as claimed in claim 11, in which the sensor means senses displacement of the second seal element from the first datum position directly.

13. The combination as claimed in claim 12, in which the sensor means includes a plurality of sensors, each of which is operable to sense a distance between the first and second sealing surfaces at a respective preselected location, the position of the first sealing surface at the said location defining the first datum position.

14. The combination as claimed in claim 11, which includes control means operably connected to the sensor means and the displacement means, the control means being operable to control the displacement means to maintain the first sealing surface in a predetermined spatial relationship with the second sealing surface.

15. The combination as claimed in claim 11, in which the sensor means senses displacement of the second seal element from the first datum position indirectly by sensing a displacement from a datum position of a component of the gas turbine mechanically fast with the rotor thereof.

16. The combination as claimed in claim 10, which includes a biasing means for biasing the first seal element in a predetermined direction, the electromagnets being configured to displace the first seal element relative to the support member in a direction opposite to the predetermined direction.

17. The combination as claimed in claim 16, in which the biasing means comprises an annular gas impermeable bellows arranged between the carrier member and the support member.

18. The combination as claimed in claim 10, in which the first seal element comprises an annular ring defining an annular first sealing surface and the second seal element defines an annular second sealing surface.

19. The combination as claimed in claim 18, which includes a rigid carrier member on which the first annular seal element is mounted, the electromagnets being operatively coupled with the carrier member and angularly spaced with respect thereto.

* * * * *